US011255968B2

(12) United States Patent
Lee

(10) Patent No.: US 11,255,968 B2
(45) Date of Patent: Feb. 22, 2022

(54) DISTANCE DETECTION SENSOR AND OPERATING METHOD THEREOF

(71) Applicant: HYUNDAI AUTRON CO., LTD., Seoul (KR)

(72) Inventor: Chul Seung Lee, Seoul (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 649 days.

(21) Appl. No.: 16/033,737

(22) Filed: Jul. 12, 2018

(65) Prior Publication Data

US 2019/0101648 A1    Apr. 4, 2019

(30) Foreign Application Priority Data

Sep. 29, 2017    (KR) .................. 10-2017-0127671

(51) Int. Cl.

| | | |
|---|---|---|
| *G01C 3/08* | (2006.01) | |
| *G01S 17/32* | (2020.01) | |
| *G01S 7/4865* | (2020.01) | |
| *G01S 7/4861* | (2020.01) | |
| *G01S 17/14* | (2020.01) | |
| *G01K 13/00* | (2021.01) | |
| *G01S 7/48* | (2006.01) | |

(Continued)

(52) U.S. Cl.
CPC .............. *G01S 17/32* (2013.01); *G01K 13/00* (2013.01); *G01S 7/4808* (2013.01); *G01S 7/4861* (2013.01); *G01S 7/4865* (2013.01); *G01S 7/497* (2013.01); *G01S 7/4915* (2013.01); *G01S 17/14* (2020.01)

(58) Field of Classification Search
CPC ...... G01S 7/497; G01S 7/4808; G01S 7/4861; G01S 7/4915; G01S 7/4865; G01S 7/14; G01S 7/32; G01K 13/00
USPC ....................................... 356/5.01
See application file for complete search history.

(56) References Cited

U.S. PATENT DOCUMENTS 5,696,657 A * 12/1997 Nourrcier, Jr. ........ G01S 7/4861
                                                361/93.8
6,950,177 B2 * 9/2005 Lewis .................... G01S 7/4811
                                               342/195

(Continued)

FOREIGN PATENT DOCUMENTS

JP       362231165 A * 10/1987 ............. G01N 30/86
JP       09-189768 A      7/1997

(Continued)

*Primary Examiner* — Mark Hellner
(74) *Attorney, Agent, or Firm* — Greenberg Traurig, LLP; Hyunho Park

(57) ABSTRACT

A distance detection sensor includes a current-to-voltage converter configured to convert a current corresponding to a detection signal reflected from a target to a voltage, an amplifier configured to amplify the converted voltage, a comparator configured to compare an output value of the amplifier with a reference value to generate a receive pulse, a reference value selector configured to select any one of a plurality of reference values as the reference value, and a time-to-digital converter configured to calculate time-of-light (TOF) time in response to the receive pulse output from the comparator. The reference value selector continuously changes different reference values respectively corresponding continuous receive pulses.

11 Claims, 5 Drawing Sheets

(51) Int. Cl.
    *G01S 7/4915*     (2020.01)
    *G01S 7/497*     (2006.01)

(56) References Cited

U.S. PATENT DOCUMENTS

| | | | |
|---|---|---|---|
| 2012/0194798 A1* | 8/2012 | Crawford | G01S 17/14 356/4.02 |
| 2015/0292942 A1* | 10/2015 | Veryeras | G01S 17/08 356/4.01 |
| 2016/0299219 A1* | 10/2016 | Suzuki | G01S 7/4865 |
| 2017/0090019 A1 | 3/2017 | Incorporated | |
| 2018/0259625 A1* | 9/2018 | Gnecchi | G01S 7/4863 |
| 2018/0284286 A1* | 10/2018 | Eichenholz | G01S 17/10 |
| 2018/0348345 A1* | 12/2018 | Haroun | G01S 17/26 |

FOREIGN PATENT DOCUMENTS

| | | | |
|---|---|---|---|
| JP | 2000-346941 A | 12/2000 |
| JP | 2013-096905 A | 5/2013 |
| JP | 2014102072 A | 6/2014 |
| JP | 2017-062169 A | 3/2017 |
| KR | 20150129187 A | 11/2015 |

\* cited by examiner

DISTANCE DETECTION SENSOR AND OPERATING METHOD THEREOF

CROSS-REFERENCE TO RELATED APPLICATIONS

This US non-provisional patent application claims priority under 35 USC § 119 to Korean Patent Application No. 10-2017-0127671, filed on Sep. 29, 2017, the entirety of which is hereby incorporated by reference.

TECHNICAL FIELD

Embodiments of the present disclosure relate to distance detection sensors and operating methods thereof.

BACKGROUND

A distance detection sensor is a sensor configured to measure a distance to an object. An irradiation pulse is irradiated to a measurement target. A distance to the measurement target is calculated based on a time difference from irradiation of the irradiation pulse to reception of a light reflected from the measurement target (light receiving pulse) based on the irradiation pulse, which is called a pulse time-of-flight (TOF) scheme. A distance measuring sensor using the pulse TOF scheme has been widely put to practical use.

SUMMARY

The present disclosure provides a distance detection sensor which minimizes a time distortion during distance measurement and an operating method of the distance detection sensor.

Example embodiments of the present disclosure provide a distance detection sensor. The distance detection sensor includes a current-to-voltage converter configured to convert a current corresponding to a detection signal reflected from a target to a voltage, an amplifier configured to amplify the converted voltage, a comparator configured to compare an output value of the amplifier with a reference value to generate a receive pulse, a reference value selector configured to select any one of a plurality of reference values as the reference value, and a time-to-digital converter configured to calculate time-of-light (TOF) time in response to the receive pulse output from the comparator. The reference value selector continuously changes different reference values respectively corresponding continuous receive pulses.

In example embodiments, the distance detection sensor may further include a photosensitive element configured to generate the detection signal.

In example embodiments, the current-to-voltage converter may include a trans-impedance amplifier.

In example embodiments, the distance detection sensor may further include a capacitor and a resistor coupled in parallel between an input terminal and an output terminal of the current-to-voltage converter.

In example embodiments, the time-to-digital converter may include a counter configured to count an interval between a transmit pulse and a receive pulse.

In example embodiments, the counter may count an interval from a rising time point of the transmit pulse to a rising time point of the receive pulse.

In example embodiments, the reference value selector may change a reference value at a falling time point of a previous receive pulse.

In example embodiments, continuous transmit pulses corresponding to the continuous receive pulses may be transmitted to the target. The number of the continuous transmit pulses may be three or more.

In example embodiments, the distance detection sensor may further include a digital signal processor configured to calculate and store TOF times respectively corresponding to the continuous transmit pulses.

In example embodiments, the digital signal processor may calculate a peak time from the TOF times and calculates a distance to the target using the peak time.

In example embodiments, the distance detection sensor may further include a temperature sensor configured to measure a temperature. The digital signal processor may compensate the distance using the temperature.

Example embodiments of the present disclosure provide an operating method of a distance detection sensor. The operating method includes transmitting continuous transmit pulses to a target, changing a reference value corresponding to each of the transmit pulses, continuously receiving a signal corresponding to each of the transmit pulses according to the changed reference value, calculating time-of-flight (TOF) peak time from received receive pulses respectively corresponding to the transmit pulses, and calculating a distance to the target from the TOF peak time.

In example embodiments, the operating method may further include receiving detection signals respectively corresponding to the transmit pulses from a photosensitive element; converting a current corresponding to each of the received detection signals to a voltage; and amplifying the converted voltages.

In example embodiments, the operating method may further include measuring a temperature; and compensating the distance according to the measured temperature.

BRIEF DESCRIPTION OF THE DRAWINGS

The present disclosure will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the present disclosure.

DETAILED DESCRIPTION

Figure 1:
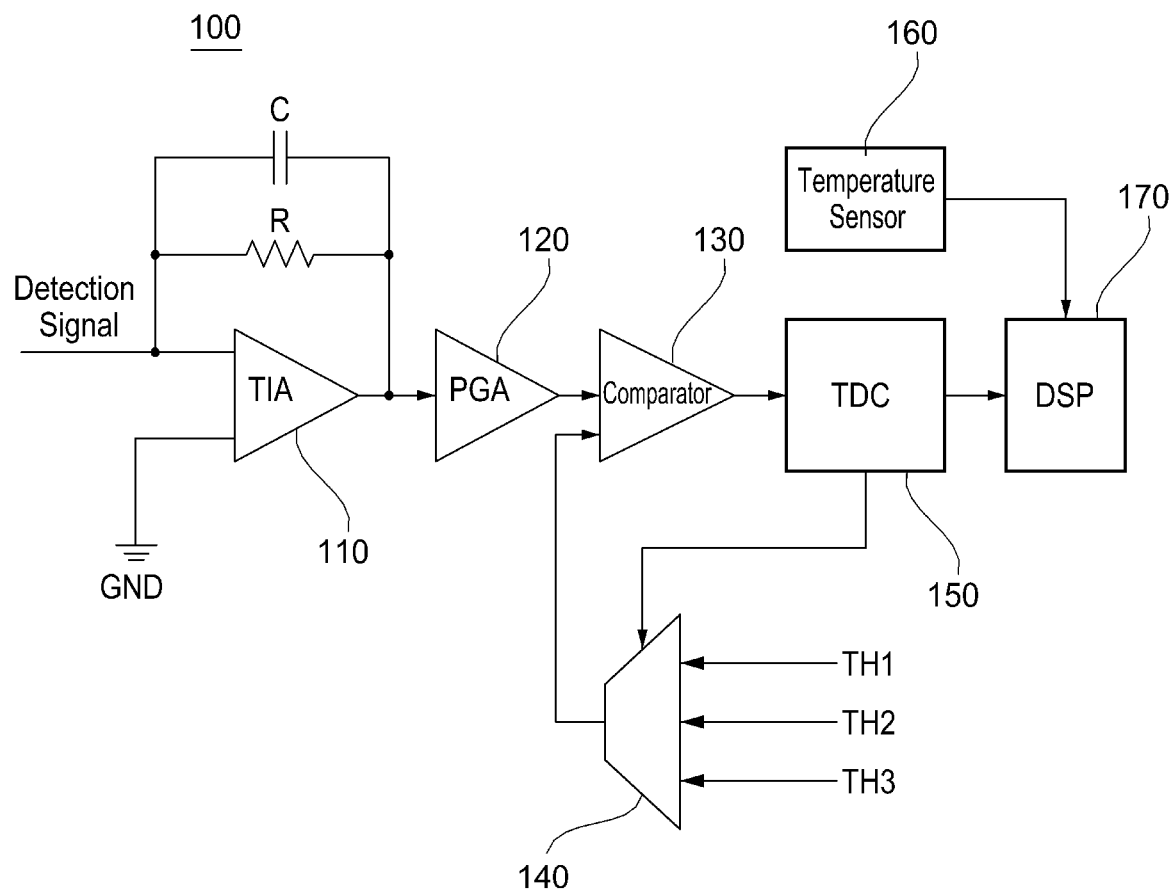
FIG. 1 is a block diagram of a distance detection sensor according to example embodiments of the present disclosure.

The advantages and features of the present disclosure and methods of achieving them will be apparent from the following exemplary embodiments that will be described in more detail with reference to the accompanying drawings. It should be noted, however, that the present disclosure is not limited to the following exemplary embodiments, and may be implemented in various forms. Accordingly, the exemplary embodiments are provided only to disclose the present disclosure and let those skilled in the art know the category of the present disclosure.

In the specification, it will be understood that when an element is referred to as being "on" another layer or substrate, it can be directly on the other element, or intervening elements may also be present. In the drawings, thicknesses of elements are exaggerated for clarity of illustration.

Exemplary embodiments of the invention will be described below with reference to cross-sectional views, which are exemplary drawings of the invention. The exemplary drawings may be modified by manufacturing techniques and/or tolerances. Accordingly, the exemplary embodiments of the invention are not limited to specific configurations shown in the drawings, and include modifications based on the method of manufacturing the semiconductor device. For example, an etched region shown at a right angle may be formed in a rounded shape or formed to have a predetermined curvature. Therefore, regions shown in the drawings have schematic characteristics. In addition, the shapes of the regions shown in the drawings exemplify specific shapes of regions in an element, and do not limit the invention. Though terms like a first, a second, and a third are used to describe various elements in various embodiments of the present disclosure, the elements are not limited to these terms. These terms are used only to tell one element from another element. An embodiment described and exemplified herein includes a complementary embodiment thereof.

The terms used in the specification are for the purpose of describing particular embodiments only and are not intended to be limiting of the invention. As used in the specification, the singular forms "a", "an" and "the" are intended to include the plural forms as well, unless the context clearly indicates otherwise. It will be further understood that the terms "comprises" and/or "comprising", when used in the specification, specify the presence of stated features, integers, steps, operations, elements, and/or components, but do not preclude the presence or addition of one or more other features, integers, steps, operations, elements, components, and/or groups thereof.

The present disclosure will now be described more fully hereinafter with reference to accompanying drawing, in which example embodiments of the present disclosure are shown.

FIG. 1 is a block diagram of a distance detection sensor 100 according to example embodiments of the present disclosure. Referring to FIG. 1, the distance detection sensor 100 includes a current-to-voltage converter (TIA) 110, an amplifier (PGA) 120, a comparator 130, a reference value selector 140, a time-to-digital converter (TDC) 150, a temperature sensor 160, and a digital signal processor (DSP) 170.

The current-to-voltage converter (TIA) 110 may be configured to convert a current output from a photosensitive element receiving a detection signal (reflected pulse) to a voltage. The photosensitive element may include a photodiode. In example embodiments, the current-to-voltage converter 110 may include a trans-impedance amplifier (TIA). As shown in FIG. 1, the current-to-voltage converter 110 may include a capacitor C and a resistor R coupled in parallel between an input terminal and an output terminal.

The amplifier (PGA) 120 may be configured to amplify an output voltage of the current-to-voltage converter 110. In example embodiments, the amplifier 120 may be a variable gain amplifier. For example, the variable gain amplifier may be a programmable gain amplifier (PGA).

The comparator 130 may be configured to compare an output voltage of the amplifier 120 with a reference value to generate a receive pulse.

The reference value selector 140 may be configured to select any one of a plurality of reference values TH1, TH2, and TH3. In example embodiments, the reference value selector 140 may continuously (or sequentially) select and output the plurality of reference values TH1, TH2, and TH3 based on a predetermined algorithm.

In example embodiments, the reference value selector 140 may continuously change difference reference values that correspond to continuous receive pulses, respectively. The continuous receive pulses may correspond to continuously transmit pulses reflected from a target, respectively.

In some embodiments, the reference value selector 140 may change a reference value in response to a receive pulse output from the comparator 130. In other embodiments, the reference value selector 140 may output the plurality of reference values TH1, TH2, and TH3 at regular time intervals. Although the three reference values TH1, TH2, and TH3 are shown in FIG. 1, it should be appreciated that the number of reference values of the present disclosure is not to be construed as being limited by the illustrative embodiments.

The time-to-digital converter (TDC) 150 may be configured to count a time-of-light (TOF) time between a transmit pulse and a receive pulse and output a counted value. For example, the time-to-digital converter 150 may be configured to count the TOF time for a period of time from the time at which a transmit pulse is transmitted from an object to the time at which an output value is received from the comparator 130. In example embodiments, the time-to-digital converter 150 may include a high-speed counter.

The temperature sensor 160 may be configured to measure a temperature of the distance detection sensor 100.

The digital signal processor (DSP) 170 may be configured to calculate a distance to an object according to the counted value output from the time-to-digital converter 150. Also the digital signal processor 170 may be configured to correct the calculated distance according to the measured temperature from the temperature sensor 160.

In general, among internal circuits of the distance detection sensor 100, a distance detection circuit (TIA/comparator/TDC) is used to measure TOF. These circuits encounter cannot detect a change in size of a reflected signal, which is their limitation. Accordingly, when the reflected signal becomes small, a temporal distortion is caused by a set threshold value. This is called a time work error, and a distance distortion occurs in that degree.

Meanwhile, the distance detection sensor 100 according to example embodiments of the present disclosure may receive three or more receive pulses from a transmission terminal (not shown), receive reflection pulses corresponding to the transmit pulses, change the reference values TH1, TH2, and TH3 for the received three or more receive pulses for each of the receive pulses, and store a time stamp for each of the changed values TH1, TH2, and TH3. By doing so, the distance detection sensor 100 may calculate the maximum of a quadratic function and minimize the time walk error through a time value at a calculated peak of a pulse.

Figure 2:
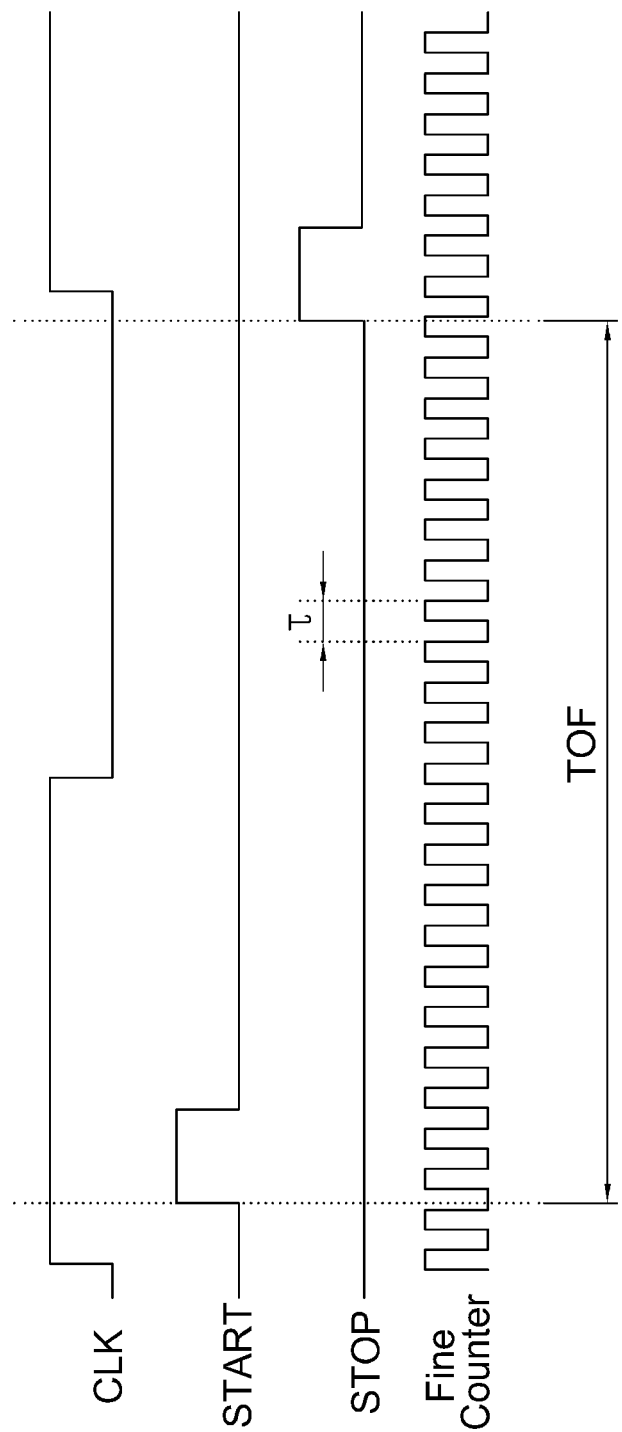
FIG. 2 is a timing diagram illustrating a method for detecting TOF in a time-to-digital converter according to example embodiments of the present disclosure.

FIG. 2 is a timing diagram illustrating a method for detecting TOF in a time-to-digital converter 150 according to example embodiments of the present disclosure.

The distance detection sensor 100 may convert a sensor signal input as a current signal through the TIA 110 to a voltage signal, amplify the voltage signal using the variable gain amplifier 120 for fine signal amplification, compare the amplified signal with a reference value of the comparator 130 to be converted to a high/low signal, and transmit the converted signal as an input of the time-to-digital converter (TDC) 150. As shown in FIG. 2, a TOF time may be sensed as an interval for the transmitted signal. In example embodiments, the TOF time may be a value counted by a precise counter. The TOF shown in FIG. 2 may be from a rising time point of a start pulse to a rising time point of an end pulse. The start pulse may be a transmit pulse, and the end pulse may be a receive pulse.

Figure 3:
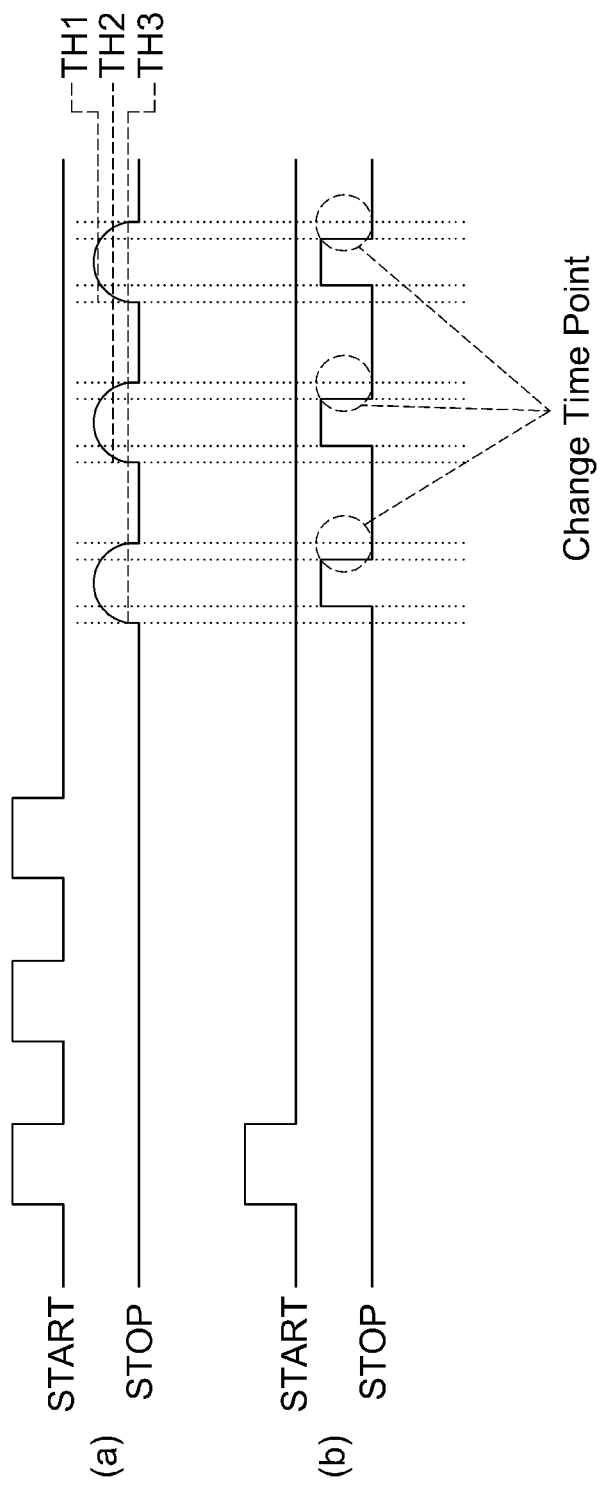
FIG. 3 illustrates timings before and after passing of a comparator according to example embodiments of the present disclosure.

FIG. 3 illustrates timings before and after passing of the comparator 300 according to example embodiments of the present disclosure. More specifically, FIG. 3(a) shows continuous transmit pulses before passing of the comparator 130 and corresponding received reflection pulses. The received reflection pulses have smaller amplitude than the transmit pulses.

FIG. 3(b) shows receive pulses by continuously selected reference values TH1, TH2, and TH3 after passing of the comparator 130. In example embodiments, a change time point of a reference value may be a falling time point of a previous reference value. However, it should be appreciated that the change time point of the reference value is not to be construed as being limited by the illustrative embodiments. For example, the reference values TH1, TH2, and TH3 may be changed considering the time at which transmit pulses are continuously generated.

Figure 4:
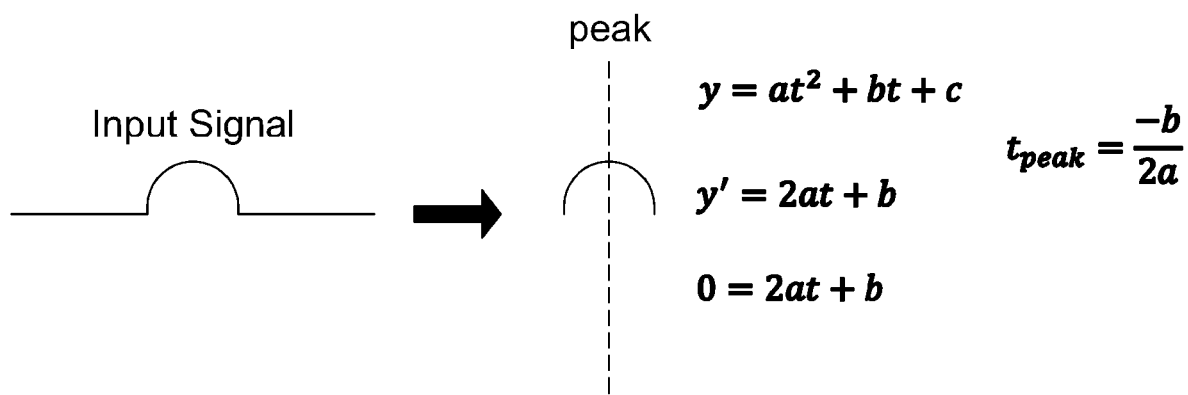
FIG. 4 illustrates a procedure of calculating a peak time of a detection signal in a digital signal processor according to example embodiments of the present disclosure.

FIG. 4 illustrates a procedure of calculating a peak time of a detection signal in a digital signal processor 170 according to example embodiments of the present disclosure. Referring to FIG. 4, a quadratic function ($y=at^2+bt+c$) is completed for a signal output from the comparator 130, i.e., a receive pulse. A peak point for an input signal may be calculated using the quadratic function, and a time value ($t_{peak}=-b/2a$) may be calculated using $y'=2at+b$ (a differential value of the quadratic function).

An equation of the quadratic function for the input signal is as follows:

$$[a \ b \ c] \begin{bmatrix} t_0^2 & t_1^2 & t_2^2 \\ t_0 & t_1 & t_2 \\ 1 & 1 & 1 \end{bmatrix} = [V_0 \ V_1 \ V_2]$$

In the above equation, $V_0$, $V_1$, and $V_2$ are reference values (TH1, TH2, and TH3 shown in FIG. 3). Accordingly, the peak time ($t_{peak}$) may be expressed by an equation below.

$$t_{peak} = \frac{-b}{2a} = \frac{V_0(t_1^2-t_2^2) - V_1(t_0^2-t_2^2) + V_2(t_0^2-t_1^2)}{V_0(t_1-t_2) - V_1(t_0-t_2) + V_2(t_0-t_1)}$$

The distance detection sensor 100 according to example embodiments of the present disclosure may reduce a distance error to the reduction of a signal amplitude and detect a rising edge during implementation of TDC to reduce a circuit size, change a reference value using three or more pulses, and store time information for each changed reference value, thereby completing a quadratic function.

Figure 5:
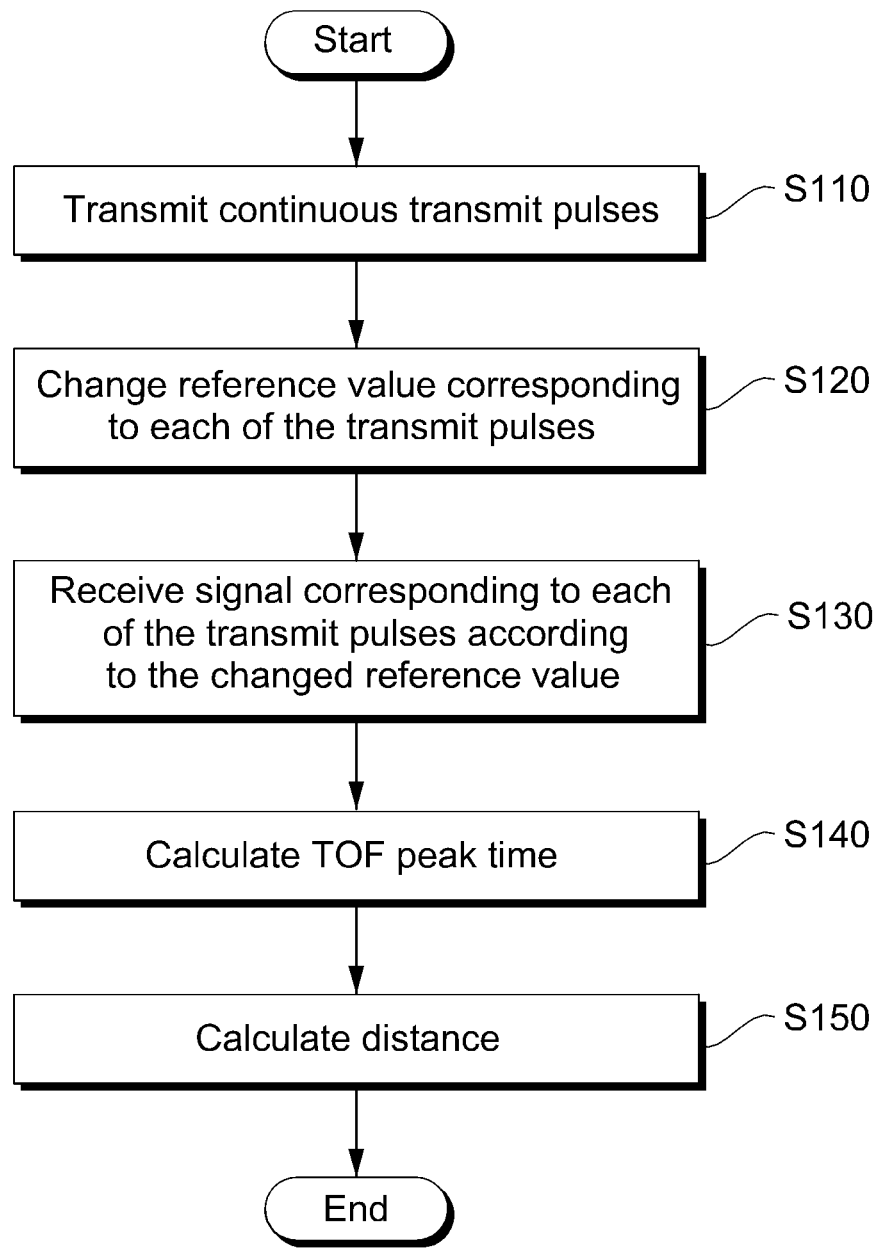
FIG. 5 illustrates an operating method of a distance detection sensor according to example embodiments of the present disclosure.

FIG. 5 illustrates an operating method of a distance detection sensor according to example embodiments of the present disclosure. Referring to FIGS. 1 to 5, the distance detection sensor 100 may operate, as follows.

Continuous transmit pulses may be transmitted to a target (S110). Pulses reflected from the target, i.e., detection signals may be received by a photosensitive element in the distance detection sensor 100. A reference value corresponding to each of the received detection signals may be changed in the reference value selector 140 (S120). The comparator 130 may compare the detection signal received by the photosensitive element with the reference value changed by the reference value selector 140 to output a digital value corresponding to TOF time (S130). The digital signal processor 170 may calculate TOF peak time for the detection signal from TOF digital values received by the changed reference values (S140). The digital signal processor 170 may calculate/correct a distance to the target using the TOF peak time and temperature (S150).

As can be appreciated by a person of ordinary skill in the art, steps and/or operations according to present disclosure may occur in other orders, or in parallel, or concurrently in other embodiments for other epochs or the like.

Depending on example embodiments of the present disclosure, some or all of the steps and/or operations may be implemented or otherwise performed, at least in part, using one or more processors running instruction(s), program(s), interactive data structure(s), client and/or server components, where such instruction(s), program(s), interactive data structure(s), client and/or server components are stored in one or more non-transitory computer-readable media. The one or more non-transitory computer-readable media may be instantiated in software, firmware, hardware, and/or any combination thereof. Moreover, the functionality of any "module" discussed herein may be implemented in software, firmware, hardware, and/or any combination thereof.

The one or more non-transitory computer-readable media and/or means for implementing/performing one or more operations/steps/modules of embodiments of the present disclosure may include, without limitation, application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like.

The distance detection sensor 100 according to example embodiments of the present disclosure may compensate time shift by receiving a plurality of transmit pulses and making reference values different from each other when receiving receive pulses respectively corresponding to the plurality of transmit pulses. The distance detection sensor 100 according to example embodiments of the present disclosure may be applied to a light detection and ranging (LIDAR) system for vehicle.

As described above, a distance detection sensor according to example embodiments of the present disclosure may transmit three or more continuous pulses, receive reflection pulses corresponding to the transmitted pulses, change reference values for the three or more received pulses for each of the receive pulses, and store a time stamp for each of the changed values. By doing so, the distance detection sensor may calculate the maximum of a quadratic function and minimize the time walk error through a time value at a calculated peak of a pulse.

Although the present disclosure and its advantages have been described in detail, it should be understood that various changes, substitutions and alterations can be made herein without departing from the spirit and scope of the disclosure as defined by the following claims.

What is claimed is:

1. A distance detection sensor comprising:
a current-to-voltage converter configured to convert a current corresponding to a detection signal reflected from a target to a voltage;
an amplifier configured to amplify the converted voltage;
a comparator configured to compare an output value of the amplifier with a reference value to generate a receive pulse;
a reference value selector configured to select any one of a plurality of reference values as the reference value; and
a time-to-digital converter configured to calculate time-of-flight (TOF) time in response to the receive pulse output from the comparator,
wherein the reference value selector continuously changes different reference values for each of the corresponding continuous receive pulses at a falling time point of a previous receive pulse,
wherein the distance detection sensor further comprises a digital signal processor configured to calculate and store TOF times respectively corresponding to the continuous transmit pulses,
wherein the digital signal processor calculates a peak time from the TOF times and calculates a distance to the target using the peak time, and
wherein the digital signal processor calculates the peak time using a quadratic function corresponding to the receive pulse.

2. The distance detection sensor of claim 1, further comprising:
a photosensitive element configured to generate the detection signal.

3. The distance detection sensor of claim 1, wherein the current-to-voltage converter includes a trans-impedance amplifier.

4. The distance detection sensor of claim 1, further comprising:
a capacitor and a resistor coupled in parallel between an input terminal and an output terminal of the current-to-voltage converter.

5. The distance detection sensor of claim 1, wherein the time-to-digital converter includes a counter configured to count an interval between a transmit pulse and a receive pulse.

6. The distance detection sensor of claim 5, wherein the counter counts an interval from a rising time point of the transmit pulse to a rising time point of the receive pulse.

7. The distance detection sensor of claim 1, wherein continuous transmit pulses corresponding to the continuous receive pulses are transmitted to the target, and
the number of the continuous transmit pulses is three or more.

8. The distance detection sensor of claim 1, further comprising:
a temperature sensor configured to measure a temperature, wherein the digital signal processor compensates the distance using the temperature.

9. An operating method of a distance detection sensor, comprising:
transmitting continuous transmit pulses to a target;
changing a reference value corresponding to each of the transmit pulses;
continuously receiving a signal corresponding to each of the transmit pulses according to the changed reference value;
calculating time-of-flight (TOF) peak time from received continuous receive pulses respectively corresponding to the continuous transmit pulses using a quadratic function corresponding to the receive pulse; and
calculating a distance to the target from the TOF peak time,
wherein changing the reference value includes continuously changing the reference value for each of the corresponding continuous receive pulses at a falling time point of a previous receive pulse.

10. The operating method of claim 9, further comprising:
receiving detection signals respectively corresponding to the transmit pulses from a photosensitive element;
converting a current corresponding to each of the received detection signals to a voltage; and
amplifying the converted voltages.

11. The operating method of claim 9, further comprising:
measuring a temperature; and
compensating the distance according to the measured temperature.

* * * * *